(12) United States Patent
Stellmacher

(10) Patent No.: US 6,766,092 B2
(45) Date of Patent: Jul. 20, 2004

(54) COMPENSATION OF THE REFRACTIVE INDEX OF DOPED INP

(75) Inventor: Max Stellmacher, Savigny/Orge (FR)

(73) Assignee: Corning Incorporated, Corning, NY (US)

( * ) Notice: Subject to any disclaimer, the term of this patent is extended or adjusted under 35 U.S.C. 154(b) by 557 days.

(21) Appl. No.: 09/886,873

(22) Filed: Jun. 21, 2001

(65) Prior Publication Data

US 2002/0028054 A1 Mar. 7, 2002

(30) Foreign Application Priority Data

Sep. 6, 2000 (EP) .............................. 00402450

(51) Int. Cl.⁷ ................................ G02B 6/10
(52) U.S. Cl. ...................... 385/131; 385/124
(58) Field of Search ...................... 385/129–131, 385/141, 145

(56) References Cited

U.S. PATENT DOCUMENTS

| | | | |
|---|---|---|---|
| 4,340,966 A | 7/1982 | Akiba et al. | 375/45 |
| 4,688,062 A | 8/1987 | Liles | 357/22 |
| 4,745,448 A | 5/1988 | Van Rees et al. | 357/22 |
| 5,175,788 A * | 12/1992 | Miura et al. | 385/131 |
| 5,208,878 A * | 5/1993 | Thulke | 385/14 |
| 5,351,323 A | 9/1994 | Miller et al. | 385/28 |
| 5,703,895 A | 12/1997 | Ghirardi et al. | 372/50 |
| 5,940,569 A * | 8/1999 | Schimpe | 385/131 |
| 6,025,207 A | 2/2000 | Mersali et al. | 438/29 |
| 6,072,812 A | 6/2000 | Eng | 372/20 |
| 6,421,492 B1 * | 7/2002 | Weber | 385/131 |

OTHER PUBLICATIONS

Efficient fiber coupling to low–loss diluted multiple quantum well optical waveguides—Deri. et al. Appl. Phys. Lett. 55 (15) Oct. 9, 1989 1495–1497.

Analysis. design and fabrication of tapered integrated optical structuresOptics Research Group—Daoping Li PhDTheses.

1.3 μm Polarization Insensitive Amplifier with Integrated Mode Transformer—Tishinin. et al Department of Electrical Engineering/Electrophysics www–scf.edu.

Photonic Application Specified Integrated Circuits (PHASICs) for Photonic Networks—Hamacher. et al. Letzte Anderung: 9/98.

(List continued on next page.)

*Primary Examiner*—John D. Lee
*Assistant Examiner*—Jennifer Doan
(74) *Attorney, Agent, or Firm*—Juliana Agon

(57) ABSTRACT

A mode transformer (10) includes a passive waveguide (120) having a first composition co-existing with a second composition to provide a guided optical wave (250). A p-doped re-growth layer (130) having the first composition is disposed on top of the passive waveguide (120). A compensated n-doped buffer (110) is disposed underneath the passive waveguide (120). The compensated n-doped buffer (110) has the first composition and a sufficient concentration of a third composition such that the compensated n-doped buffer layer has a reduced index difference between the p-doped re-growth layer (130) and the compensated n-doped buffer layer (110) to compensate the index difference between the p-doped re-growth layer (130) and the originally un-compensated n-doped buffer in order to preserve the symmetry of the guided optical wave (250).

30 Claims, 3 Drawing Sheets

OTHER PUBLICATIONS

Optoelectronics Packaging: An Enabling Technology—M. Dagenais www.ieee.org/organiations/pubs/newsletters/leos/apr97/html/feature.htm.

Alignment Tolerant Lasers and Silicon Waferboard Integration—Dagenais. et al. Dept. of EE and Laboratory for Physical Sciences U. of MD. Collage Park. MD.

Carrier–induced change due to doping in refactive index of InP: Measurements at 1.3 and 1.5$\mu$m—L. Chusseau. et al—Appl. Phys. Lett. 69 (20) Nov. 11, 1996.

INGaAsP/InP tapered active layer multiquantum well laser with 1.8dB coupling loss to cleaved singlemode fibre.– Lealman et al—Electronics Letters Sep. 29, 1994 vol. 30 No. 20 pp. 1685–1687.

Low–loss beamwidth transformers on InP with reduced requirements on lithographic resolution.– R. Zengerle J. Vac. Sci. Technol. B. vol. 11. No. 6. Nov./Dec. 93 p. 2641–2644.

Low–Loss Fibre–Chip Coupling by Buried Laterally Tapered Inp/InGaAsp Waveguide Structure—R. Zengerle. et al Electronics Letters Mar. 26, 1992 vol. 28 No. 7.

* cited by examiner

FIG. 2 VECTOR FIELD 2D & STRUCTURE VIEW

COMPENSATION OF THE REFRACTIVE INDEX OF DOPED INP

CROSS REFERENCE TO RELATED APPLICATION

This application claims the benefit of European Application No. 00402450.1, filed Sep. 6, 2000 now E.P. 1186918.

BACKGROUND OF THE INVENTION

1. Field of the Invention

The present invention relates generally to opto-electronic devices, and particularly to an optical mode transformer.

2. Technical Background

Optical mode transformers (OMTs) are known to reduce optical coupling loss by mode transforming between a smaller mode of an optical device and a larger mode of an optical fiber. Spot-size transformation is needed from the 1–2 um range of the (usually elliptical) guided mode of the optical device (such as a laser, for example) to the 8–10 um range of the (circular) guided mode in the optical fiber (usually single-mode). The OMT is the region in an electro-optical device, including the optical device monolithically defined within the electro-optical device, where the shape of the guided wave is transformed. The transformation is obtained by the variation of the shape of the waveguides, such as by tapering. However, carrier-induced change in the refractive index of the material used for the OMT due to doping has increased coupling loss more than expected. The presence of dopants of opposed conductivities, is necessary for the electron transport of active optical devices. In a typical laser, for example, an active region is sandwiched between an n-doped buffer layer and a p-doped over-growth layer. It is known that n-doping changes the refractive index more than p-doping. Although other III–V compounds can be used. InP is often used for high speed optical electronics such as above 10 GHz because an InP device is faster (carrier mobility is higher) than GaAs device. When the InP layer is doped (n or p), free carriers are present in the InP material in the conduction band or in the valence band. These carriers can absorb light (i.e. absorb a photon by a band transition). When the absorption is modified, the index is also modified. Due to the effective mass difference between an electron and a hole, for the same doping level, the index change is more pronounced for n (electron) doping. Therefore, a need exists to reduce this difference in the carrier-induced change in the refractive index of an OMT to further reduce the coupling loss of the OMT.

SUMMARY OF THE INVENTION

One aspect of the present invention is a mode transformer that includes a passive waveguide having a first composition sandwiched between two layers of a second composition. A p-doped re-growth layer having the second composition is disposed on top of the passive waveguide. A compensated n-doped buffer is disposed underneath the passive waveguide. The compensated n-doped buffer has the first composition and a sufficient concentration of a third composition such that the compensated n-doped buffer layer has a reduced index difference between the p-doped re-growth layer and the compensated n-doped buffer layer to compensate the index difference between the p-doped re-growth layer and an un-compensated n-doped buffer in order to preserve the symmetry of the guided optical wave.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
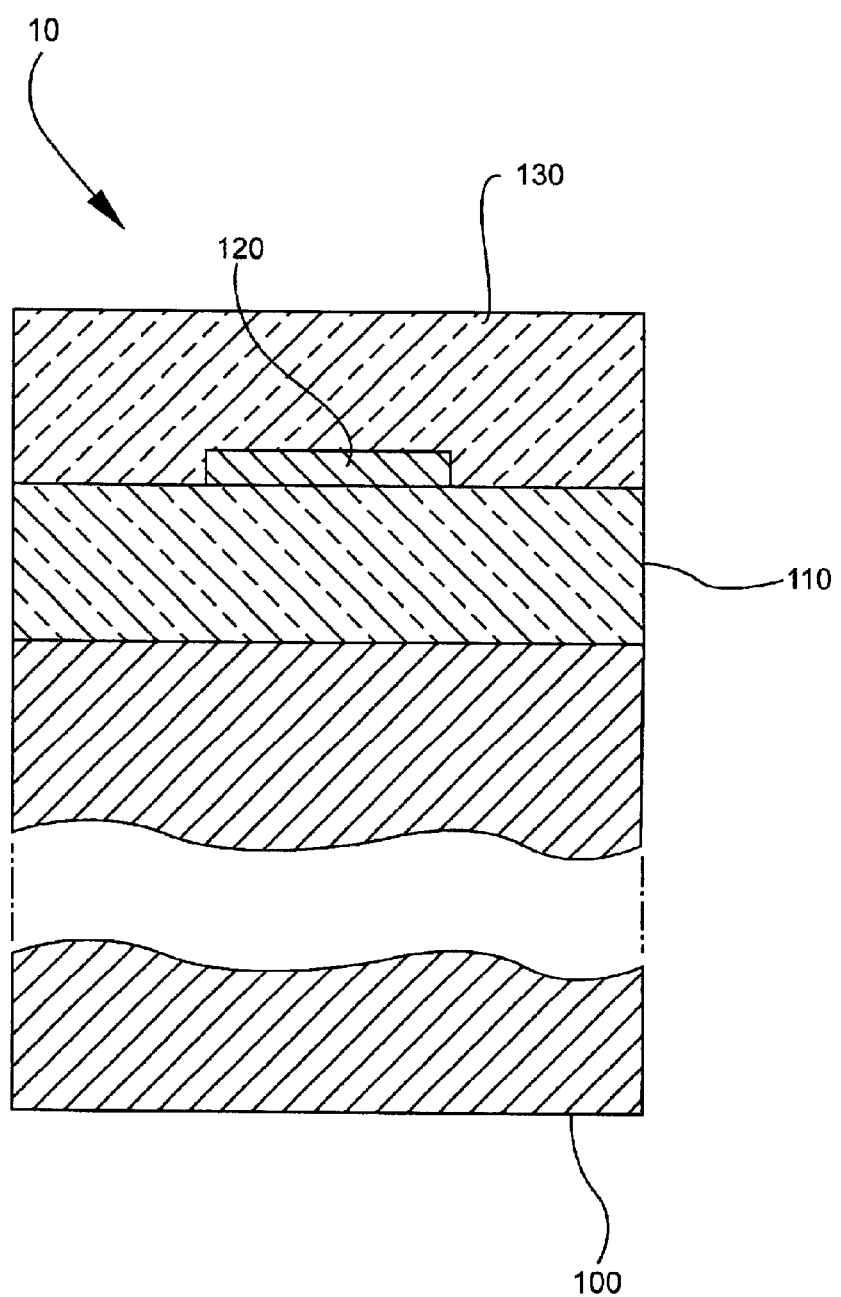
FIG. 1 is a simplified partial cross-sectional view of a mode transformer, in accordance with the teachings of the invention.

Reference will now be made in detail to the present preferred embodiment of the invention, an example of which is illustrated in the accompanying drawings, where the references are not to scale. Wherever possible, the same reference numbers will be used throughout the drawings to refer to the same or like parts. An exemplary embodiment of the mode transformer of the present invention is shown in FIG. 1, and is designated generally throughout by reference numeral 10. In accordance with the invention, the present invention for the mode transformer includes a passive waveguide 120 having a first composition co-existing with a second composition to provide a guided optical wave. Although other III–V compounds are usable, for high-speed operation, the first composition is preferably InP co-existing with the second composition of GaAs to provide a quaternary passive waveguide layer 120 of InGaAsP, serving as a core for the guided optical wave to be confined within and having a core refractive index.

A p-doped re-growth layer 130 having the first composition is disposed on top of the passive waveguide 120. For high-speed applications, the p-doped re-growth layer 130 is preferably an epitaxial growth of InP having a re-growth refractive index lower than the core refractive index of the quaternary passive waveguide layer 120 for the re-growth layer 130 to act as a top cladding for the core of the quaternary passive waveguide layer to confine light within the quaternary passive waveguide layer 120. One can use a ridge structure (without a regrowth), but the confinement will not be symmetrical. Hence, the function of the regrowth layer is to provide a top cladding layer which is symmetrical to the bottom cladding layer.

Similarly and symetrically, a compensated n-doped buffer 110 is disposed underneath the passive waveguide 120 to act as a bottom cladding for the passive waveguide 120. The compensated n-doped buffer 110 also has the same first composition, preferably of InP, but also has a sufficient concentration of a third composition, which can be the same as the second composition of GaAs, such that the compensated n-doped buffer layer 110 has a reduced index difference between the p-doped re-growth layer 130 and the compensated n-doped buffer layer 110. Instead of using a standard n-doped InP bulk buffer, alone as an un-compensated buffer, the compensated buffer is used as taught by the present invention.

As is known, the mode transformer 10 further includes a substrate 100 for epitaxially growing the buffer layer 110. For optoelectronic applications, III–V compounds, such as the group III elements of In, Ga, or Al, and the group V elements, such as As, P, N, Sb, are used as the substrate 100. The common substrates 100 used currently are InP and GaAs. As InGaAs substrates become available in the future, this and other types of substrates can also be used. However, for high-speed opto-electronic applications, the preferred substrate material currently is InP.

In one implementation, as seen in FIG. 1, the compensated buffer 110 is an alloy having a lower concentration of Ga and As atoms than In and P atoms to form a n-doped InGaAsP buffer layer. The range of percentage of Ga and As atoms needed is approximately less than 1% and preferably 0.1%. Hence, a buffer compensator is disposed within the normally n-doped InP buffer, the buffer compensator having Ga and As atoms to compensate for the carrier-induced change in refractive index of the n-doped InP buffer layer for resulting in a compensated n-doped InP buffer layer such that the compensated n-doped InP buffer layer 110 has a reduced index difference between the p-doped InP re-growth layer 130 and the compensated n-doped InP buffer layer 110. Therefore, the buffer compensator can be Ga and As atoms or any other composition having a refractive index slightly higher than the original buffer material that would slightly increase the refractive index of the original buffer by combining with the buffer.

Figure 2:
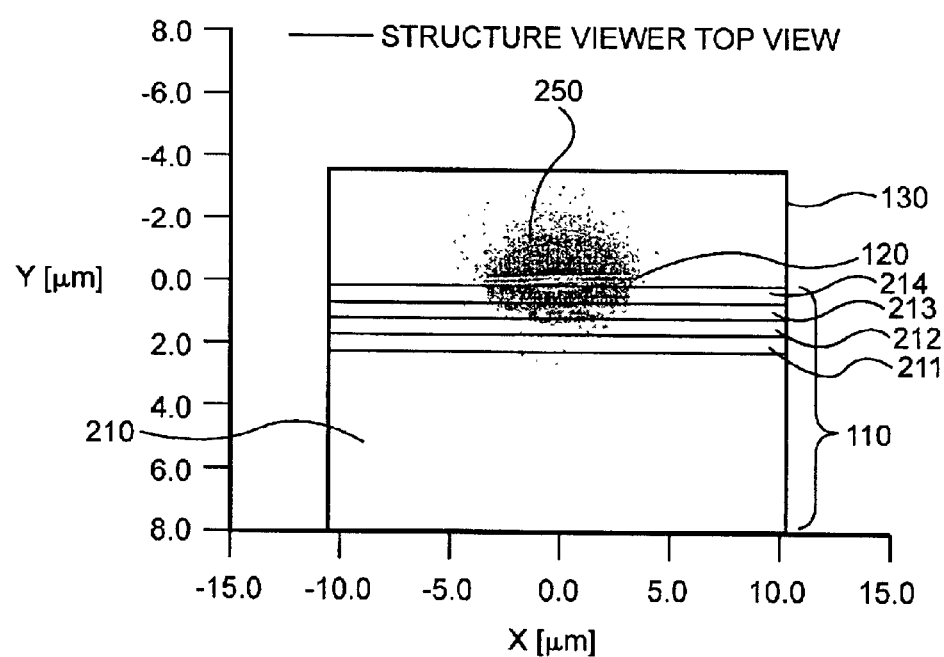
FIG. 2 is a side elevation view of FIG. 1 showing a more detailed two-dimensional vector field and structure view of the compensated buffer 110 of a second embodiment of the mode transformer of FIG. 3, in accordance with the teachings of the invention.
Figure 3:
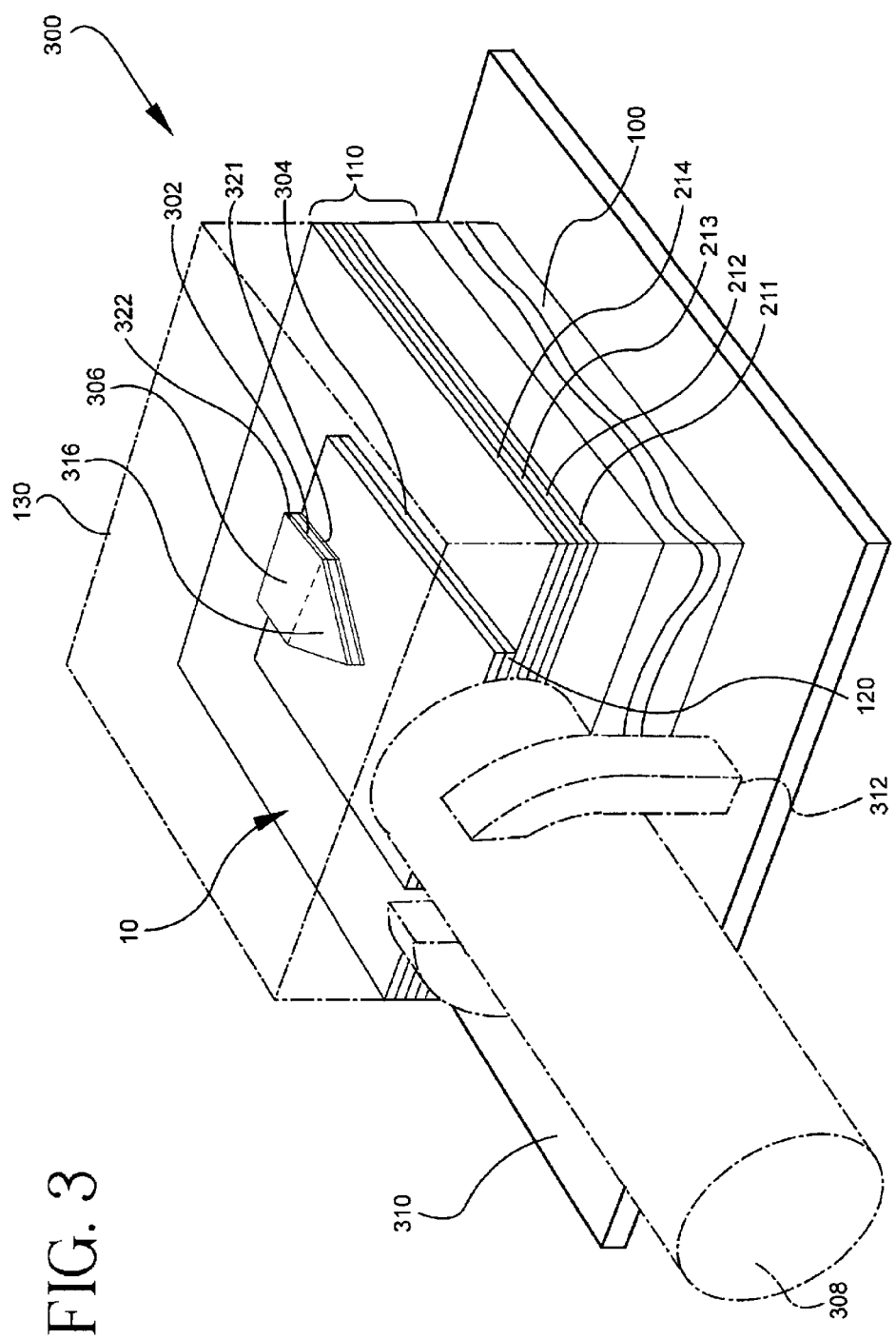
FIG. 3 is a perspective view of the second embodiment of the mode transformer, similar to the first embodiment 10 of FIG. 1, assembled on a motherboard, in accordance with the teachings of the invention.

Referring to FIG. 2, another implementation of the compensated buffer 110 is represented as 110' and also seen in FIG. 3. Preferably, the compensated buffer 110' comprises a thin series of layers of the second composition, such as GaAs, disposed on a bulk deposition of the first composition, InP, such that a series of thin InGaAsP layers are inserted in the n-InP bulk buffer. This layer insertion is easier to implement than forming an actual alloy of n-doped InGaAsP because the introduction of the layers is easier to control than the introduction of only a few percentage of Ga and As atoms. The compensated buffer 110' is made-up of four 0.5 um of InGaAsP layers 211–214 epitaxially grown on top of an n-doped InP bulk uncompensated buffer 210 having a thickness of about 6 um and an n-doping level of $n=1\times10^{18} cm^{-3}$. As an example, the thickness of each of the InGaAsP layers is 0.03 $\mu$m, which are inserted in the n-InP buffer. The InP substrate is about 200 $\mu$m thick and available as a commercial substrate having about an eptiaxial growth of 3 $\mu$m thickness to form a buffer and waveguides and then another epitaxial growth of 4–6 $\mu$m to form the regrowth.

As an example of the improved electric field intensity achievable from the inventive compensated buffer of the mode transformer 10, the more centralized T.E 0,0 guided mode of the electric field 250 is shown more localized around the passive waveguide 120 and the compensated buffer 110' than what would be expected, localized around the re-growth layer 130, if the buffer was uncompensated. In this example, the passive waveguide 120 is preferably a buried ridge stripe passive waveguide structure for emitting light at a wavelength ($\lambda$) of 1.1 um from a quaternary layer of InGaAsP having a width of 7.0 um and a thickness of 0.07 um. The passive waveguide 120 is further buried in the re-growth layer 130 that is preferably a p-doped InP layer. The thickness of this re-growth layer is typically about 4–6 $\mu$um. With this geometry, the coupling loss of this mode transformer is only about 0.2 to 0.3 dB higher than the coupling loss of an ideal case where the doping effect is not taken into account. In contrast, in a standard uncompensated buffer, the real coupling loss of the mode transformer is about 1 dB higher than the expected ideal case.

Referring to FIG. 3, the mode transformer of FIG. 1 is shown in a perspective representation, with an active waveguide or layer 302, disposed on top of the passive waveguide or layer 120, separated by an optional spacer 304, for mode transforming between a smaller mode (about 1 um) of an In-P optical device 306 and a larger mode (about 10 um) of an optical fiber 308 for forming an optical mode transformer assembly 300. The optional spacer 304 is a thin layer between the active waveguide or layer 302 and the passive waveguide or layer 120. The spacer 304, if used, allows a better confinement of the guided wave in the active waveguide 302 where the gain in a laser, for example, is proportional to the confinement.

The assembly 300 includes a Silicon motherboard 310 for supporting the In-P optical device 306 and the optical fiber 308. This Silicon motherboard is another name for a silicon optical bench. Optionally supported by a fiber holder 312 on the motherboard 310, the fiber 308 is butt-coupled at approximately the spot represented by the electrical field 250 shown in FIG. 2.

Preferably, the In-P optical device 306 is a buried ridge stripe structure defined monolithically with the mode transformer 10 on the same n-doped InP substrate, such that the broad end of a preferably tapered portion 316 of the active waveguide 302 is integrated with the optical device 306 that is shown as the untapered portion of the active waveguide 302. The laser is shown as the untapered portion of the active waveguide. With this monolithic integration, the buried ridge stripe structure having the passive waveguide of the preferable InGaAsP composition confines and transforms the guided optical wave from the In-P optical device 306 to the optical fiber 308, along with the similar function of the active waveguide 302. The active waveguide is where the optical gain is localized (for a laser or an SOA). It is also where the carriers are converted to photons in a detector. Thus, reciprocally, the active regions is where the photons are converted to carriers. The p-doped InP re-growth layer 130 is disposed on top of the buried ridge stripe structure for burying the passive waveguide. Thus, the In-P optical device 306 is a laser, a semiconductor optical amplifier (SOA), a detector, or any other InP based opto-electronic device that need to be fiber pigtailed or hybridized on the Silicon motherboard 310.

According to the teachings of the present invention, the compensated buffer 110 compensates the index difference between the p-doped and the n-doped InP layers 130 and 110, respectively, in order to preserve the symmetry of the guided wave. When a material is n-doped, its index is reduced proportionally to the doping concentration. Because of the high effective mass of the hole, when a material is p-doped, its index is only slightly reduced. Thus in a typical laser structure, for example, where the active waveguide is sandwiched between an n-doped and a p-doped cladding or confinement layers 321 and 322, respectively, there is a refractive index difference between the upper and the lower cladding layers 322 and 321, respectively. Because GaAs has a higher index value than InP, the reduction of the index due to the doping in n-doped InP can be compensated by introduction of a certain concentration of GaAs in the Inp material such that the light is confined more in the lower cladding layer. This lower cladding layer 321 does not need to be compensated. The compensation is for the passive waveguide so it is the buffer layer 110 which has to be compensated to have the same index as the regrowth 130.

The light has to be confined and transferred into the fiber 308 from the optical device 306. The mode of the fiber 308 has a circular symmetry. So ideally the symmetry of the guided wave should also be circular. The index difference between the n-doped and p-doped material and the overgrowth layer 130 and the buffer 110 breaks the vertical symmetry of the guided wave. The compensation of the buffer 110 having a sufficient concentration of Ga and As atoms such that the compensated n-doped buffer layer has a reduced index difference between the p-doped InP re-growth layer 130 and the compensated n-doped buffer layer 110 should restore this symmetry. The top laser cladding layers 321 and 322 does not cause the index to change. At the end facet the active region is tapered down to zero, so 321 and 322 do not play any role.

Instead of using a buried ridge stripe structure for the passive waveguide 120, a buried hetero-structure can also benefit from a compensated layer. As is known, a heterostructure is a stack of different layers, where each layer has a different composition Generally, every opto-electronic device, such as a laser, is a heterostructure. In each n-doped InP layer, a concentration of GaAs can be introduced to compensate the index reduction due to the n-doping by the increase of the index due to the GaAs introduction in the InP material.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical mode transformer comprising:
   an n-doped InP substrate;
   an n-doped InP buffer disposed on the n-doped InP substrate;
   a buried ridge stripe structure grown on the n-doped InP buffer, the buried ridge stripe structure having a passive waveguide of an InGaAsP composition;
   a p-doped InP re-growth layer for burying the passive waveguide onto the n-doped InP buffer; and
   a buffer compensator disposed within the n-doped InP buffer, the buffer compensator having Ga and As atoms to compensate for the carrier-induced change in refractive index of the n-doped InP buffer layer for resulting in a compensated n-doped InP buffer layer such that the compensated n-doped InP buffer layer has a reduced index difference between the p-doped InP re-growth layer and the compensated n-doped InP buffer layer.

2. The optical mode transformer of claim 1 wherein the buffer compensator comprises a series of thin InGaAsP layers inserted into the n-doped InP buffer.

3. The optical mode transformer of claim 1 wherein the buffer compensator comprises a series of thin InGaAsP layers disposed on top of the n-doped Inp buffer.

4. The optical mode transformer of claim 1 wherein the buffer compensator comprises at least one InGaAsP layer disposed within the n-doped InP buffer.

5. The optical mode transformer of claim 1 wherein the buffer compensator comprises at least one InGaAsP layer disposed on top of the n-doped InP buffer.

6. A method for mode transforming between a smaller mode of an In-P optical device and a larger mode of an optical fiber, the method comprising the steps of:
   providing a Silicon motherboard for supporting the In-P optical device and the optical fiber;
   providing an n-doped InP substrate;
   growing an n-doped InP buffer on the n-doped InP substrate;
   growing a buried ridge stripe structure on the n-doped InP buffer, the buried ridge stripe structure having a passive waveguide of an InGaAsP composition for confining a guided optical wave from the In-P optical device to the optical fiber for forming an optical mode transformer;
   growing a p-doped InP re-growth layer for burying the passive waveguide onto the n-doped InP buffer;
   disposing within the n-doped InP buffer Ga and As atoms to compensate for the carrier-induced change in refractive index of the n-doped InP buffer layer for resulting in a compensated n-doped InP buffer layer such that the compensated n-doped InP buffer layer has a reduced index difference between the p-doped InP re-growth layer and the compensated n-doped InP buffer layer to form a mode transformer; and
   disposing the mode transformer grown on the n-doped InP substrate onto the Silicon motherboard.

7. The method of claim 6 wherein the step of disposing within the n-doped InP buffer Ga and As atoms includes inserting at least one InGaAsP layer into the n-doped InP buffer.

8. An optical mode transformer assembly for mode transforming between a smaller mode of an In-P optical device and a larger mode of an optical fiber, the optical mode transformer assembly comprising:
   a Silicon motherboard for supporting the In-P optical device and the optical fiber;
   an n-doped InP substrate disposed on the Silicon motherboard;
   a buried ridge stripe structure defined monolithically on the n-doped Inp substrate, the buried ridge stripe structure having a passive waveguide of an InGaAsP composition for confining a guided optical wave from the In-P optical device to the optical fiber;
   a p-doped InP re-growth layer disposed on top of the buried ridge stripe structure for burying the passive waveguide; and
   a compensated n-doped buffer disposed between the n-doped InP substrate and the buried ridge stripe structure, the compensated n-doped buffer having a sufficient concentration of Ga and As atoms such that the compensated n-doped buffer layer has a reduced index difference between the p-doped InP re-growth layer and the compensated n-doped buffer layer.

9. An optical mode transformer for mode transforming between a smaller mode of an optical device having a first composition and a larger mode of an optical fiber, the optical mode transformer comprising:
   a Silicon motherboard for supporting the optical device and the optical fiber;
   a substrate having the first composition doped with a first dopant, the substrate disposed on the Silicon motherboard;
   a waveguide defined monolithically on the substrate, the waveguide having a second composition co-existing with the first composition for confining a guided optical wave from the optical device to the optical fiber;

a re-growth layer having the first composition doped with a second dopant, the re-growth layer disposed on top of the waveguide; and a buffer disposed between the substrate and the waveguide, the buffer doped with the first dopant and having a lower concentration of the second composition than the first composition for compensating the carrier-induced change in refractive index of the re-growth layer such that the buffer layer has a reduced index difference between the re-growth layer and the buffer layer.

10. The optical mode transformer of claim 9, wherein the first composition comprises InP.

11. The optical mode transformer of claim 9, wherein the second composition comprises GaAs.

12. The optical mode transformer of claim 9, wherein the second composition comprises a III–V compound.

13. The optical mode transformer of claim 9, wherein the first dopant provides for n-doping.

14. The optical mode transformer of claim 9, wherein the second dopant provides for p-doping.

15. The optical mode transformer of claim 9, wherein the first dopant and the second dopant are of opposite polarity.

16. The optical mode transformer of claim 9, wherein the buffer comprises a thin series of layers of the second composition disposed on a bulk deposition of the first composition.

17. The optical mode transformer of claim 9, wherein the buffer comprises an alloy having a lower concentration of Ga and As atoms than In and P atoms.

18. The optical mode transformer of claim 9, wherein the buffer has a lower concentration of Ga and As atoms than In and P atoms.

19. A mode transformer comprising:

a passive waveguide having a first composition co-existing with a second composition to provide a guided optical wave;

a p-doped re-growth layer having the first composition disposed on top of the passive waveguide; and a compensated n-doped buffer disposed underneath the passive waveguide, the compensated n-doped buffer having the first composition and a sufficient concentration of a third composition such that the compensated n-doped buffer layer has a reduced index difference between the p-doped re-growth layer and the compensated n-doped buffer layer to compensate the index difference between the p-doped re-growth layer and an un-compensated n-doped buffer in order to preserve the symmetry of the guided optical wave.

20. The mode transformer of claim 19 wherein the first composition has a first refractive index and the third composition has a second refractive index that is greater than the first refractive index.

21. The mode transformer of claim 20 wherein the third composition is the same as the first composition.

22. The mode transformer of claim 20 further comprising a substrate for epitaxially growing the buffer layer.

23. The mode transformer of claim 22 wherein the substrate comprises a III–V compound.

24. The mode transformer of claim 23 wherein the substrate has the first composition comprising at least one of the group III elements of In, Ga, or Al, compounded with at least one of the group V elements of As, P, N, or Sb.

25. The mode transformer of claim 24 wherein the compensated n-doped buffer is deposited by epitaxy on the substrate.

26. The mode transformer of claim 24 wherein the passive waveguide having the first composition of InP co-existing with the second composition of GaAs to provide a quaternary passive waveguide layer of InGaAsP, serving as a core, having a third refractive index.

27. The mode transformer of claim 26 wherein the p-doped re-growth layer having the first composition of InP and the first refractive index, wherein the first refractive index of the p-doped re-growth layer is lower than the third refractive index of the quaternary passive waveguide layer to act as cladding for the core of the quaternary passive waveguide layer to confine light within the quaternary passive waveguide layer.

28. The mode transformer of claim 23 wherein the substrate comprises the first composition of InP.

29. The mode transformer of claim 23 wherein the substrate comprises the first composition of GaAs.

30. The mode transformer of claim 23 wherein the substrate comprises the first composition of InGaAs.

* * * * *